July 25, 1961  R. K. BROWN  2,993,529
FOLDING BUNK SEAT FOR BOATS
Filed Jan. 25, 1960  3 Sheets-Sheet 1
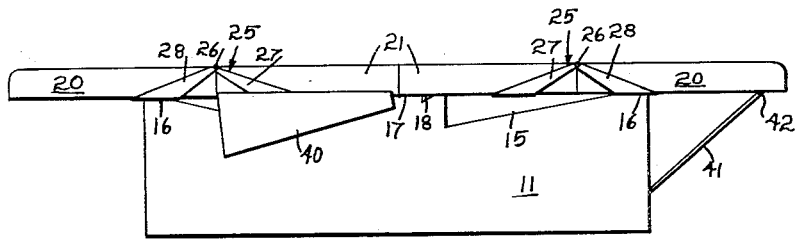
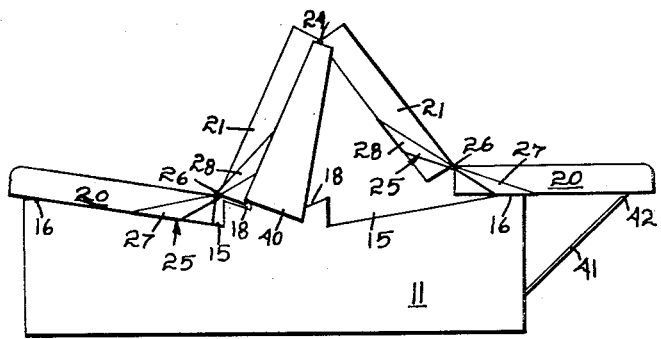
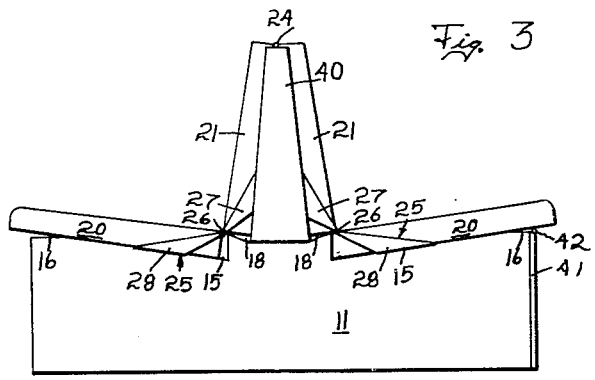
INVENTOR.
RICHARD K. BROWN
BY
ATTY.

July 25, 1961 R. K. BROWN 2,993,529
FOLDING BUNK SEAT FOR BOATS
Filed Jan. 25, 1960 3 Sheets-Sheet 2

INVENTOR.
RICHARD K. BROWN.
BY
ATTY.

July 25, 1961 R. K. BROWN 2,993,529
FOLDING BUNK SEAT FOR BOATS
Filed Jan. 25, 1960 3 Sheets-Sheet 3

INVENTOR.
RICHARD K. BROWN
BY
ATTY.

United States Patent Office 2,993,529
Patented July 25, 1961

2,993,529
FOLDING BUNK SEAT FOR BOATS
Richard K. Brown, Spokane, Wash., assignor to D-Mar Manufacturing Company, Inc., Spokane, Wash., a corporation of Washington
Filed Jan. 25, 1960, Ser. No. 4,542
4 Claims. (Cl. 297—65)

This invention relates to a seat for small boats which can easily be converted into a level bunk for sleeping.

The popularity of relatively small boats using modern outboard motors has precipitated a need for a combination seat and bunk which will provide maximum seating comfort during the day and which can easily be arranged in a level position for maximum comfort at night. This invention answers this call by the use of a folding seat which has a raised central portion that can be collapsed to form a level bunk. It provides seating for two persons in a minimum space and is converted in one operation to a comfortable individual bunk.

It is an object of this invention to provide such a folding bunk seat which is easily adaptable to any boat installation and which can be firmly set in place in the boat.

It is a further object of this invention to provide a bunk seat having cushions fixed to a frame and adapted to be pivoted without any gaps between cushions at any position.

It is a further object of this invention to positively position such a seat in the desired positions without the use of latches or any outside levers. The seat frame is the only movement limiting structure utilized.

It is a further object of this invention to provide a tilted seat for maximum seating comfort, which is easily rearranged in one motion to a horizontal level bed for maximum sleeping comfort.

These and further objects will be evident from a study of the following description and the accompanying drawings which illustrate one preferred form of my invention. The invention is defined in the annexed claims and is not to be limited by the example given in the specification except as it is limited in the claims.

In the drawings:

FIGURE 1 is a side view of the invention in a fully extended position;

FIGURE 2 is a side view of the invention with only one side extended;

FIGURE 3 is a side view of the invention with neither side being extended;

Figure 4:
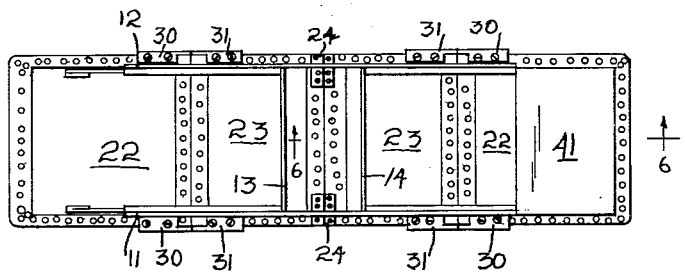
FIGURE 4 is a bottom view of the invention in the position of FIGURE 1.
Figure 5:
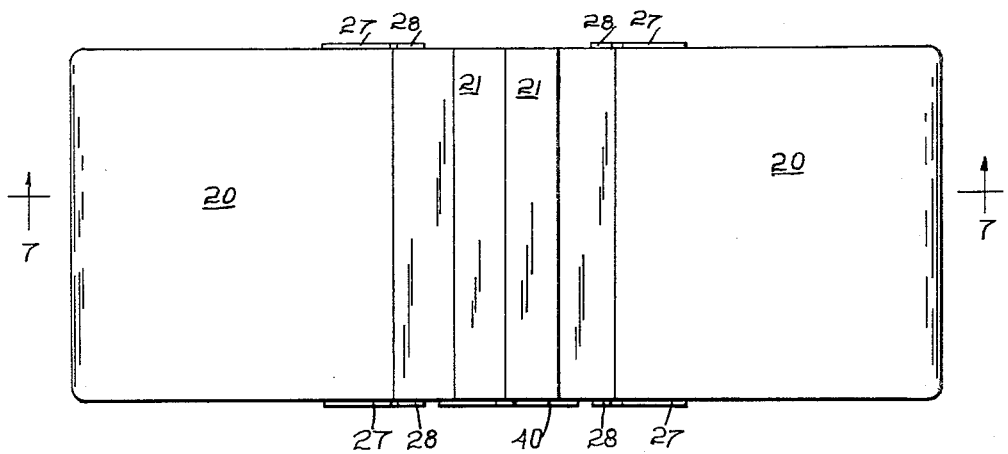
FIGURE 5 is an enlarged top view of the invention in the position of FIGURE 4.

Referring now to the drawings, the bunk seat is shown in a standard form which may be modified to fit the contour of the boat deck and walls in any particular installation. The seat rests upon a frame comprised of two identical side walls 11 and 12 and two spacing supports 13 and 14 which are rigidly connected between side walls 11 and 12. The top edge of each side wall 11 or 12 is cut on an incline designated as 15. Incline 15 corresponds to the desired incline of the seat cushion. Inclines 15 terminate short of the ends of side walls 11 and 12, where a horizontal edge 16 is formed between the inclines 15 and the ends of the side walls 11 and 12. The inclines 15 extend inwardly to the spacing supports 13 and 14 where they terminate in vertical edges which extend upwardly to a central horizontal edge 17 which is level in elevation with edges 16. Clearance for the back rests is provided by two notches 18 in each side wall 11 or 12.

The seat 20 and the back rests 21 may be of any desired size or shape depending upon the particular installation and are made of suitable cushion material. Each seat 20 is mounted on a backing board 22 of plywood or suitable material. Each back rest 21 is similarly mounted on a backing board 23. These backing boards extend the length and width of the cushions and match the cushion contours.

The hardware for the bunk seat consists of hinges 24 between the backing boards 23 for the back rests 21 which are of usual design and are mounted on the outer surfaces of the backing boards 23 so that when the boards 23 are in the same plane, no gap exists between them. The hinges 25 between the back rests 21 and the seats 20 are formed so as to place the hinge pivot 26 between the two cushions and at their top surfaces. This enables hinge 25 to be pivoted without forming a gap between the cushions of the seats 20 and back rests 21. Hinge 25 is formed of two plates 27, 28 which are bent perpendicularly to form bases 30, 31, which are attached to the backing boards 22 and 23. The shape of hinges 25 may be varied according to the design of the seats, but pivot 26 must be retained in the position shown with respect to the cushions.

Figure 6:
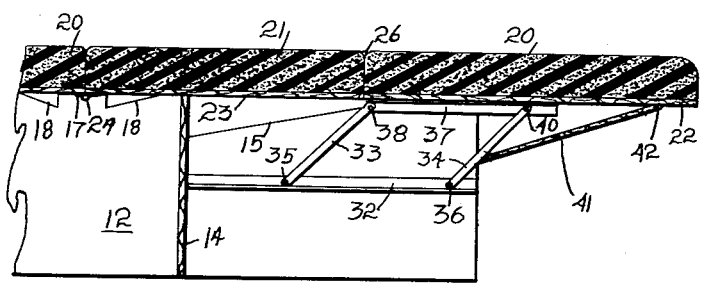
FIGURE 6 is an enlarged fragmentary sectional view taken along line 6—6 in FIGURE 4.
Figure 7:
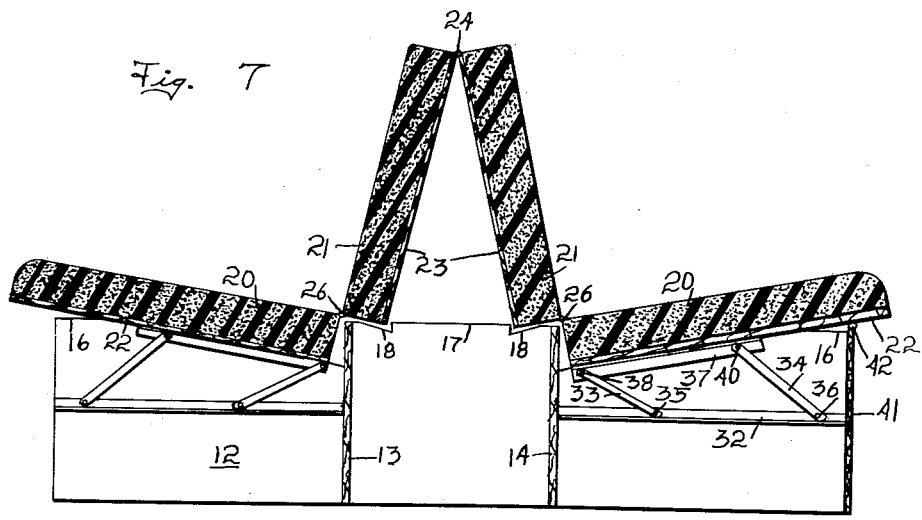
FIGURE 7 is an enlarged sectional view taken along line 7—7 in FIGURE 5.

The seat positioning assembly is best shown in FIGURES 6 and 7. A fixed support 32 formed of angle stock is bolted or otherwise attached to the inner surface of the side walls 11 and 12. Two support levers 33 and 34 are pivoted to the fixed support 32, the pivots being designated as 35 and 36 respectively. A second support 37 formed of angle stock is secured to the outer surface of backing board 22 of the seat 20. Support 37 is pivoted at 38 and 40 to the two support levers 33 and 34 respectively.

In this arrangement the inner support lever 33 must be shorter than the outer support lever 34. Also, the distance between pivots 35, 36 must be less than the distance between the pivots 38 and 40. This relationship is necessary to maintain seat 20 at the desired angle of tilt when a seat is formed and yet allow it to level when a bed is formed. The exact distances may be varied depending on the seat height and angle desired, so long as this basic relationship is maintained. It is also important that each position of seat 20 be over the center of both support levers 33 and 34 so that each position will be stable.

In designing the seat, inclines 15 are cut to correspond with the desired angle of support 37 and the elevation of the horizontal edges 16 and 17 must be the same as the horizontal elevation of support 37. In this manner, the backing boards 22 of the seats 20 are the only elements in contact with the side walls 11 and 12 when the seats are formed. The back rests 21 support each other and do not have to depend on side walls 11 and 12, but only upon hinges 25. The seat positions of both cushions is best seen in FIGURES 3 and 7. If desired, one seat 20 may be extended to its horizontal position as shown in FIGURE 2. This results in both back rests 21 being further relaxed than in their normal positions. When both seats 20 are horizontal as shown in FIGURE 1, the center area of the back rests 21 are supported by the central edges 17 of side walls 11 and 12.

As can be seen in FIGURES 1–3, the various positions of the seat are easily obtainable. To extend either seat 20, it must merely be lifted and pulled outward. To raise the back rests 21 from the horizontal position, they are merely lifted at their junction to break the toggle. Then the seats 20 must be pushed inward. No locks or latches are necessary due to the over-center action of the hardware.

In order to present a better looking chair, a cover 40 is shown attached to one of the back rests 21. Cover 40 may be attached to the backing board 23 for the back rest 21 by means of any suitable attachment arrangement. Cover 40 is normally attached only on visible sides of the back rests 21 and serves only to cover the area between the back rests 21 when they are in their steeply inclined positions.

Exposed ends of the frame are shown covered by a plate 41 hinged to the outside edge of one of the backing boards 22 for a seat 20. Plate 41 is biased toward the frame by a spring-biased hinge 42. When the seat 20 is extended to its horizontal position, plate 41 will rest against the support levers 34. When the seat 20 is pushed back, plate 41 will ride along and fit flush with the ends of side walls 11 and 12. Again, plate 41 will normally be provided only on exposed ends of the assembly.

In fitting this bunk seat to small craft, it is often necessary to rearrange side walls 11 and 12 to one side of the assembly and to make one wall shorter than the other to compensate for the deck contour. However, this can easily be done without changing the essential relationships described. Also, the cushions may be contoured on one side so as to fit along the side walls of the boats. These and other obvious changes are contemplated within this invention to fit the seats in their desired installations.

The side walls 11 and 12 are normally fastened to the boat deck by any desired means, and are not free to be tossed by boat movement. This is of utmost importance in boat safety. In this manner, the seat may be customized to fit one area of the boat and no further adjustments or maintenance will ever be necessary. All components can be made of weatherproof and rustproof materials for trouble-free use.

The specific example shown is for illustration only and is subject to many changes obvious to one skilled in this art. Therefore, only the following claims are meant to limit the scope of the invention.

Having thus described my invention, I claim:

1. A bunk-seat for installation in boats comprising a frame composed of two parallel vertical sides, support means joining said sides to form a rigid structure, each of said sides being provided with inclines cut downward and inward toward the central portion of said sides from points near the outer ends of the top edges, said inclines being identical to one another and corresponding inclines on the sides being cut in a single plane, the top edges of said sides further including raised central portions having an elevation equal to that at their outer ends, seat means adapted to rest upon corresponding inclines of the sides, back rest means hinged to said seat means at the end of the seat means adjacent to the central portion of said sides, said back rests also being hinged to each other at their ends opposite to the joinder of the seat means and back rest means, and means pivoted to both the seat means and to the sides adapted to guide said seat means into place upon said inclines when the back rest means are at a substantial right angle with respect to said seat means, said means being also adapted to guide said seat means into place upon said outer ends of the top edges when said means is shifted over its center from its position with the seat means upon the inclines.

2. In a folding bunk-seat for boats, the combination with a supporting frame including two vertical sides arranged parallel to one another and rigidly connected by support means, said frame being adapted to be secured to the deck surface of the boat, the top edges of said frame sides being cut along inclines leading downward from points near their outer ends toward their central portions, said inclines terminating at a central portion having an elevation equal to that of the outer ends of the sides; of a pair of seats having cushions thereon and adapted to seat upon corresponding inclines on the two sides, a pair of back rests having cushions thereon, one end of each back rest being pivoted by hinge means to the end of a corresponding seat adjacent said central portion of the sides, the pivot of said hinge means being in line with the adjacent edges of the cushions of the respective seat and back rest being hinged, and being at the top surface elevation of said cushions, the end of said back rests opposite said one ends being hinged to one another by hinge means mounted on said back rests, said seats being connected to said sides by individual mounting means pivoted to the seat and to the sides, said mounting means including an over-center arrangement whereby each seat may be selectively positioned with said mounting means on either side of its center to selectively form a pair of chairs or a level bunk.

3. The combination as defined in claim 2 wherein said mounting means for an individual seat comprises a support structure mounted between the seat and each of said sides, each support structure including a first support lever pivoted at one end to the seat and pivoted at its remaining end to the side, a second support lever pivoted at one end to the seat with its pivotal connection being longitudinally displaced from the pivotal connection of the first support lever and the seat, the remaining end of said lever being pivoted to the side with its pivotal connection being longitudinally displaced from the pivotal connection of the first support lever and the side, the length of the first support lever being less than the length of said second support lever, and the distance between the pivotal connections of the seat with said first and second support levers being greater than the distance between the pivotal connections of the side with said first and second support levers.

4. The combination defined in claim 2 further comprising a flat plate carried by the outer end of the seat and depending downwardly from the seat, said plate being hinged to the seat and being spring biased toward the frame, said plate being formed to cover the end of the frame when the seat is in position to form a chair.

References Cited in the file of this patent

UNITED STATES PATENTS

| | | |
|---|---|---|
| 1,271,702 | Griffith | July 9, 1918 |

FOREIGN PATENTS

| | | |
|---|---|---|
| 51,474 | Denmark | Mar. 30, 1936 |
| 551,589 | Belgium | Oct. 31, 1956 |